Figure 1:
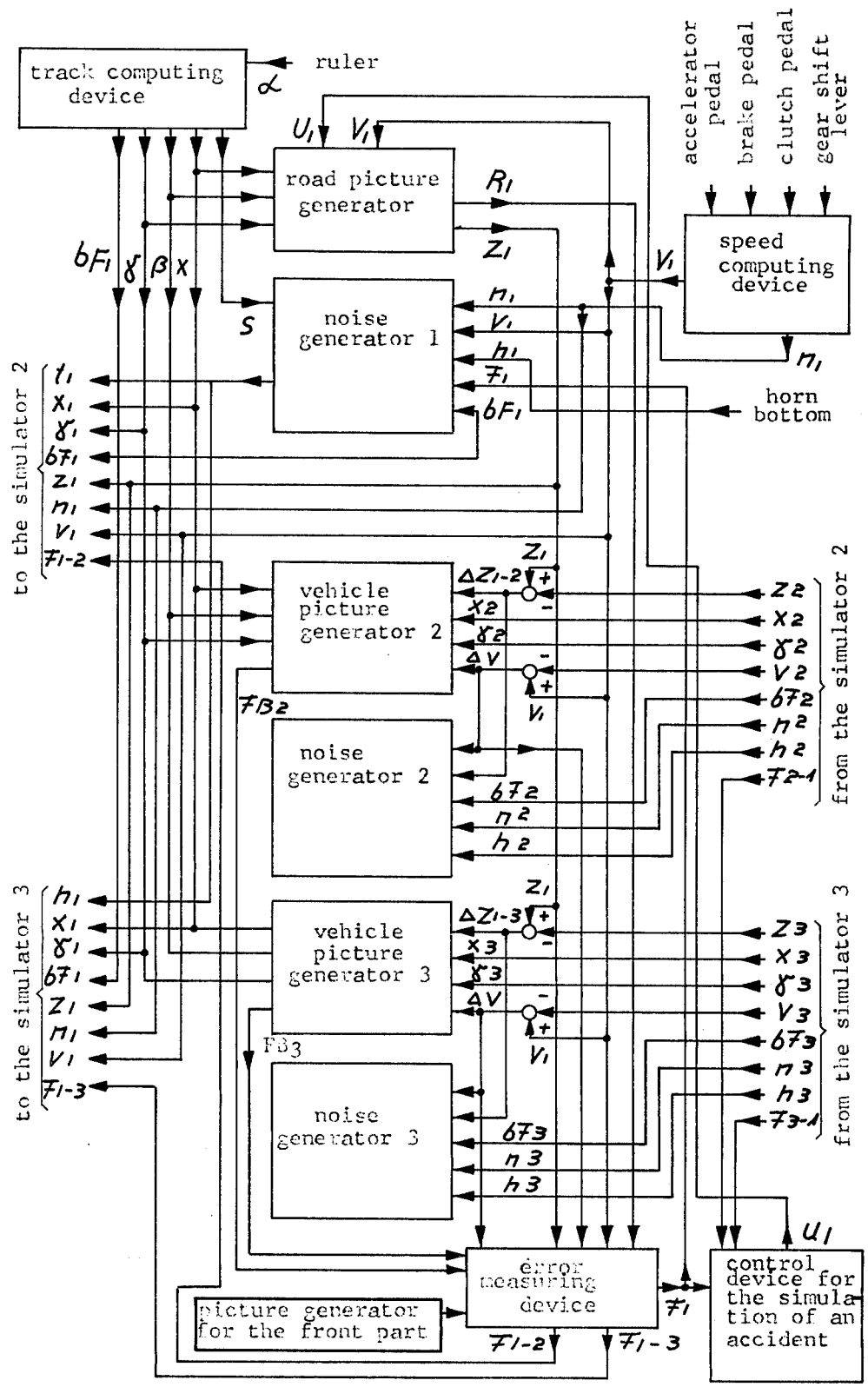

United States Patent [19]

Foerst

[11] 4,196,528
[45] Apr. 8, 1980

[54] DRIVING SIMULATOR

[75] Inventor: Reiner Foerst, Gummersbach, Fed. Rep. of Germany

[73] Assignee: Dr.-Ing. Reiner Foerst Gesellschaft mit beschränkter Haftung, Gummersbach, Fed. Rep. of Germany

[21] Appl. No.: 872,062

[22] Filed: Jan. 25, 1978

[30] Foreign Application Priority Data

Jan. 26, 1977 [DE] Fed. Rep. of Germany ....... 2703025

[51] Int. Cl.² .............................................. G09B 9/04
[52] U.S. Cl. ................................................... 35/11 R
[58] Field of Search .................. 35/11 R, 11 A, 12 N; 273/1 E, 85 G, 86 B, DIG. 28; 272/100, 73, DIG. 5, DIG. 6

[56] References Cited

U.S. PATENT DOCUMENTS

| 3,454,942 | 7/1969 | Chamberlin et al. | 272/DIG. 6 |
|---|---|---|---|
| 3,537,191 | 11/1970 | Aso | 35/11 R |
| 3,686,776 | 8/1972 | Dahl | 35/11 R |
| 3,690,657 | 9/1972 | Nakamura | 35/11 R X |
| 3,777,410 | 12/1973 | Robinson | 35/9 B |
| 3,778,058 | 12/1973 | Rausch | 273/85 G |
| 3,831,172 | 8/1974 | Olliges et al. | 273/85 G |
| 3,833,759 | 9/1974 | Yatabe | 35/11 R |
| 4,026,555 | 5/1977 | Kirschner et al. | 273/85 G |
| 4,053,740 | 10/1977 | Rosenthal | 273/DIG. 28 |
| 4,060,915 | 12/1977 | Conway | 35/12 N |
| 4,078,317 | 3/1978 | Wheatley et al. | 35/12 N |
| 4,112,422 | 9/1978 | Mayer et al. | 273/DIG. 28 |

FOREIGN PATENT DOCUMENTS 1460003 12/1976 United Kingdom ............ 273/DIG. 28

Primary Examiner—Vance Y. Hum
Attorney, Agent, or Firm—Becker & Becker, Inc.

[57] ABSTRACT

The devices of the simulation include several individual driving simulators of the same kind, disclosed in U.S. Pat. No. 4,077,138 Foerst issued Mar. 7, 1978 being connected to each other via signal lines; each one including computing devices, computing the speed, the parallel track position, the track angle, the sloping position in case of the vehicle being a bike, and the centrifugal acceleration; an interface device transferring the computed data into video signals; a road picture generator; vehicle picture generators; noise generators; an error detection device, and a control device for the simulation of an accident.

6 Claims, 2 Drawing Figures

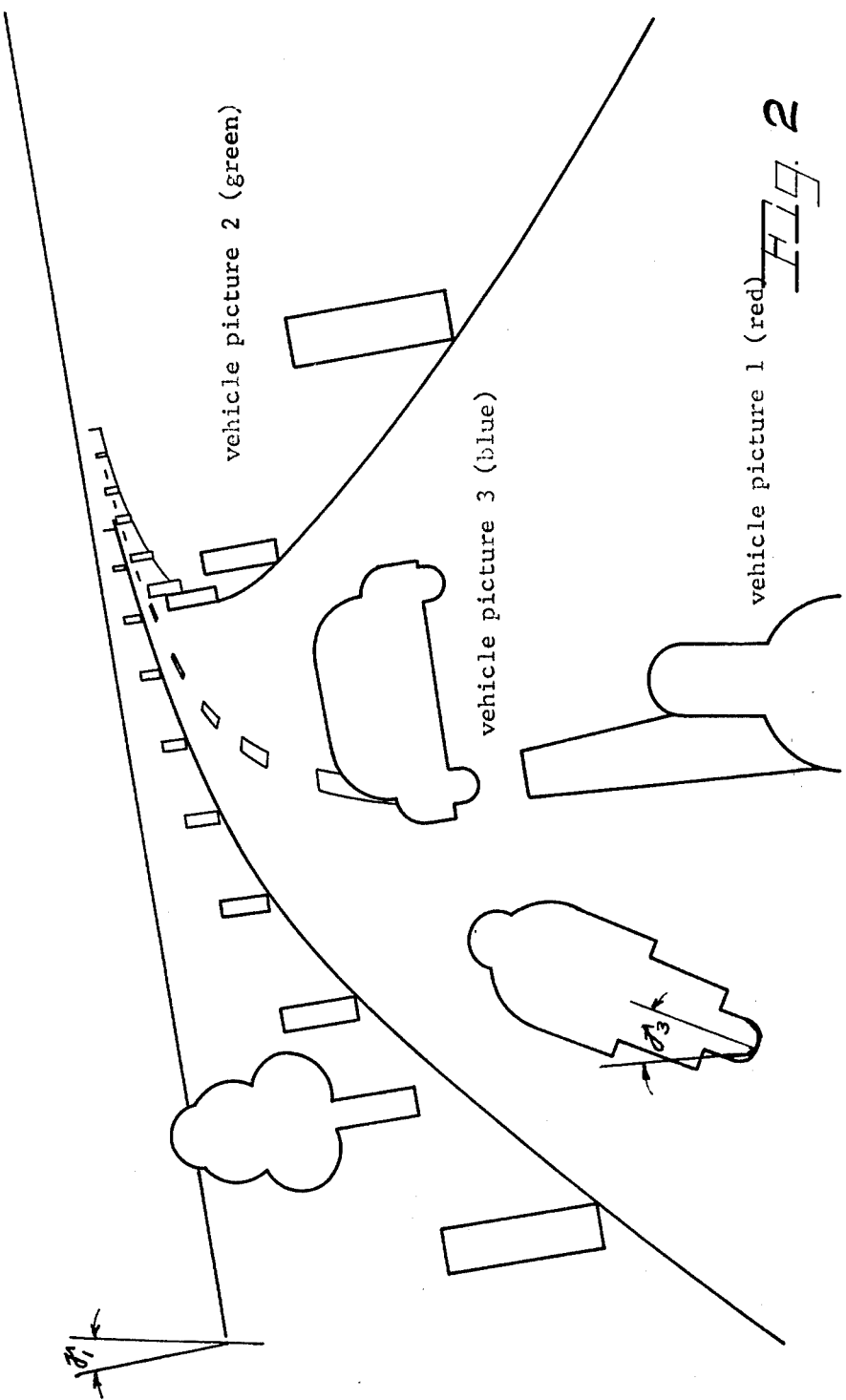

DRIVING SIMULATOR

The invention relates to a driving simulator consisting of several devices for the simulation of one ride each on a curved common road, each one using one screen for the road picture and the back mirror picture, perspectively observed by the driver, a device for the generation of the road picture, and control devices for influencing the road picture according to U.S. Pat. No. 4,077,138-Foerst issued Mar. 7, 1978.

Devices for the simulation of one single ride on a road without other traffic are known in special, designs disclosed for example by U.S. Pat. No. 4,077,138-Foerst issued Mar. 7, 1978. The disadvantages of these known designs are that only one driver uses the road and that the ride only of a car but not of a bike is simulated. Therefore, the object of this invention is to create a device by which several drivers get the experience to drive at the same time on a common road, each one using an individual device with one-fold screen and one-fold control device, which is also capable to simulate a ride on a motorcycle or a bicycle.

Before explaining how this object was solved it may shortly be explained what is happening in reality at a ride of several cars which drive simultaneously on one road: Every driver is seeing through his own windshield the front part of the car, the road with its enclosures and the middle-line, the other road users, and, possibly, static objects as houses, trees, bridges.

From the view of the driver the front part of the car is not moving. The road and the static objects are moving with the speed V of the car towards the driver, and the other road users are moving with the difference between the own speed and that of the other road users toward the driver. The movement of the individual spots across a vertical screen is thereby nonlinear according to the perspective and is increasing - at constant speed of the car - according to the function $y=f(t)$ from top to bottom.

A lateral vertical or horizontal distance of the length H accepts in the projection the length $H_B = H \times f_1(y)$. A distance $\Delta z$ in longitudinal horizontal direction accepts in the projection the length $\Delta y_B = \Delta z \times f_2(y)$. The speed of the picture movements obeys the same function $dy/dt = V \times f_2(y)$. Other road users moving with the speed $V_m$ accept in the projection the speed $dy_m/dt = (V - V_m) \times f_2(y)$. The size H of which is in the projection dependent on the distance, respectively on the vertical position on the screen: $H_B = H \times f_1(y)$.

Furthermore it may shortly be explained which events are happening in reality at a ride of a single track vehicle (bike, motorcycle or bicycle): The angle of the bike towards the vertical is named $\gamma$, the curvature of the track of the bike which is proportional to the angle of the ruler $\alpha$, the weight of the bike including the weight of the driver G, the parallel track position x, and the track angle towards the longitudinal axis of the road $\beta$. The bike is kept in its dynamical balance at each instance by the sum of centrifugal acceleration F and the horizontal component $G_x$ of the weight G.

Therefore the sloping position $\gamma$, the track angle $\beta$, and the parallel track position x are functions of ruler angle $\sigma$, weight G, and time t. The angle of the horizon against the real horizontal line seen from the driver is equal to the sloping position $\gamma$.

The object can be solved according to the invention as follows: For the representation of the individual vehicles the invention provides as many individual driving simulators using for the performance the features of the driving simulator of U.S. Pat. No. 4,077,138-Foerst issued Mar. 7, 1978. Every individual driving simulator comprises a picture screen, a ruler, other control devices as accelerator pedal, brake pedal, clutch pedal, gear shift lever, and horn button. The individual simulators are connected to each other via signal lines transferring the signals for the speed V, the engine rotation n, the parallel track position x, the sloping position $\gamma$, the centrifugal acceleration $b_F$, and a characteristic of the vehicle. The characteristic may be color or shape. Every driver is seeing on his screen the other road users as long as they are within his viewing distance. He is identifying them, he is recognizing their parallel track positions, their sloping positions and their speed, he is hearing their engine and drifting noises. When generating their noises, the dependency of their volume on the distance and the Doppler-effect is simulated.

For the representation of a bike the invention says that the road picture is turnable according to the sloping position of the bike. Furthermore it says, that the maximum sloping position cannot be exceeded, that a scratching noise is generated according to the noise of footholds touching the road surface at this sloping position and that a downfall is simultaed when the angle of the ruler is not corrected.

The invention is illustrated by way of example in the accompanying drawings, in which:

FIG. 1 by way of a block diagram shows an individual simulator according to the invention.

FIG. 2 is a view on the television screen for a specific example.

Referring now to the drawings in detail, in FIG. 1 it is assumed as an example that two additional (not shown) individual simulators of the same design belong to the total simulator. All devices representing the behavior of the own vehicle are marked by the subscript 1, those of the two other vehicles by the subscripts 2 and 3.

The road picture generator 1 generates the picture of the middle line, the embankment rail, the embankment posts and static objects in the environment of the road. It generates also the curves. It is influenceable by the speed signal V to which the speeds of all road picture movements are proportional, by the signal x for the parallel track position which effects a distortion of the picture around the intersection point of the longitudinal road axis with the horizon, by the signal $\beta$ for the track angle which effects a horizontal displacement of the picture, and by the signal $\gamma$ for the sloping position of a bike which effects a turning of the picture.

Outputs of the raod picture generator are besides the video signal for the television screen the signal $z_1$, which is a measure for the distance of the own vehicle from the starting point, and the separate output video signal $R_1$ for the road enclosure which is needed for the triggering of an error signal when the road enclosures are touched.

The road picture generator may function analog or digital, it is known from the U.S. Pat. No. 4,077,138-Foerst issued Mar. 7, 1978, except the idea of a turning of the picture via the control input $\gamma$. It is not necessary therefore to explain its functioning in detail.

The turning of the picture is achieved according to the invention via a computing unit which turns all picture spots around one appropriate point of the vertical middle line of the picture. This kind of picture turning can be achieved by the aid of modern micro processors economically. The computer program for this can be put up by one skilled in the art, once the task is given, without difficulty, form which reason it is not explained here furthermore in detail.

The noise generator 1 generates the engine noise, the drifting noise, the noise of the horn, and the accident noises of the own vehicle, using the rotation n, the centrifugal acceleration $b_F$, the horn button signal h, and the error signals F. It is also known from the U.S. Pat. No. 4,077,138-Foerst issued Mar. 7, 1978.

The speed computing device computes the speed signal V using the position of the accelerator pedal, the brake pedal, clutch pedal and gear shift lever in dependence upon the time.

This device is also known from my above mentioned U.S. Pat. No. 4,077,138-Foerst issued Mar. 7, 1978. However, according to the invention the speed signal can be derived directly from the rotation of a wheel of a fitness tool which is driven by muscular power of the driver.

The track computing device computes the parallel track position x (parallel displacement of the vehicle towards the middle of the road), the direction $\beta$ (angle of the longitudinal axis of the road), and the sloping position $\gamma$ (angle of the bike towards the vertical), using the ruler angle $\alpha$ from cars or bikes and the speed signal V. Furthermore for the noise generation, the computing device outputs a signal $b_F1$ for the centrifugal acceleration is known from U.S. Pat. No. 4,077,138-Foerst issued Mar. 7, 1978 except for the computation of the sloping position, the track, and the direction of bikes. The implementation of the analog computation of the three above mentioned quantities can be undertaken by a person skilled in the art without difficulty and for this reason it is not explained here further in detail.

The vehicle generator 2 generates the picture of the vehicle 2, observed perspectively by the driver 1. The color of this vehicle is equal to that of the frontpart of the vehicle 2.

The vehicle picture 2 moves across the screen like the picture of static objects according to the nonlinear function y=f (t). The speed of this movement is proportional to the speed difference ($V_1-V_2$). Therefore, this signal is led to the vehicle picture generator 2.

The lateral track deviation of the vehicle picture 2 from the middle of the road is computed by the vehicle picture generator 2 using the parallel track position signal $x_2$ from the simulator 2. This deviation is performed relative to the middle of the road and relative to the width of the road. The width of the road decreases from bottom to top which is taken into account for the computation of the position by aid of the distance signal. This signal is derived from the difference of the distances $z_1$ and $z_2$ of the two vehicles. From this signal and the track position $x_2$ the exact position and size of the vehicle picture 2 relative to the road picture is derived. Jointly together with the road picture the vehicle picture 2 is additionally distorted, displaced, and turned by the above mentioned signals x, $\beta$, and $\gamma$. In case that the distance between the two vehicles exceeds the view distance no vehicle picture is generated.

The computation of speed, position, angle, and size of the vehicle picture 2 is achieved by the above mentioned quantities according to nature and the perspective. Once the task is known, this can be achieved without difficulty by the aid of modern micro processors by one skilled in the art (see claim 14 of U.S. Pat. No. 4,077,138-Foerst issued Mar. 7, 1978), for which reason it is not further explained in detail.

The noise generator 2 generates that noises which are caused by the vehicle 2 and heard by the driver 1. These are mainly the engine rotation noise, the noise of drifting tires, and the noise of the horn. Therefore, the noise generator 2 uses as input signals the signal $n_2$ for the engine rotation, the signal $b_{F2}$ for the centrifugal acceleration, and the signal $h_2$ for the horn of the vehicle 2.

According to the invention the volume of these noises shall decrease with increasing distance between vehicle 1 and vehicle 2. Therefore, the distance signal is supplied to the noise generator 2 as difference between the position $z_1$ of the own vehicle and the position $z_2$ of the vehicle 2. Therefore, according to the invention, the noise generator 2 comprises an electronic volume control.

According to the invention, the frequency of these noises shall be higher than the frequency in vehicle 2 according to the Doppler-effect, when the two vehicles approach, and lower when the two vehicles move away from each other. Therefore, the noise generator 2 is supplied besides the difference of the position $z_1$ and $z_2$ by the difference of the speeds $V_1$ and $V_2$.

According to the invention, the noise generator 2 comprises an additional device by which, when the two vehicles approach, a component is added to the noise frequency defining signal, which is proportional to the speed difference, and in which, when the two vehicles move away from each other, the same component is subtracted. In order to distinguish approaching and moving away, a flip-flop is provided which jumps from one into the other state with a hysteresis when the two positions $z_1$ and $z_2$ are equal.

The road picture generator 3 and the noise generator 3 are designed in the same way as the corresponding generators 2. They are supplied from simulator 3 by the seven signals $z_3$, $x_3$, $\gamma_3$, $V_3$, $b_{F3}$, $n_3$ and $h_3$. These signals are also supplied from simulator 1 to all other simulators.

The generator for the front part of the car is known from the U.S. Pat. No. 4,077,138-Foerst issued Mar. 7, 1978. It generates the static video picture of the front part of a car or a bike.

The error measuring device 1 detects and selects the touching between the front part of the car 1 and the enclosure of the road, between the front part of car 1 and the vehicle 2, and between the front part of car 1 and the vehicle 3. An error is triggered when the corresponding video signals show up at the same time.

In order to detect accidents in the individual simulators in an easily understandable manner, the invention proposes that an error is triggered only when at the touching instance the speed of the own vehicle was higher than that of the other. In such a case an error signal F is supplied to the concerned extraneous simulator. In the same way, the simulator 1 is supplied by the error signal from another simulator when the own speed was lower at the instant of the accident.

By this it can further be achieved that errors which are caused by the own vehicle are more emphasized than those from extraneous vehicles.

The error measuring device is described in U.S. Pat. No. 4,077,138-Foerst issued Mar. 7, 1978, for the case that the own vehicle touches the embankment posts. The same implementation can be used for the case that two vehicle pictures touch each other. To meet the object of separating errors, which are caused by vehicles with different speeds the error measuring device of the foregoing application additionally comprises simple logic units and two flip-flops which jump from one state into the other when the speeds between the own vehicle and the two extraneous vehicles are equal. Therefore this is not further explained here in detail.

A control unit for the simulation of an accident is known from my U.S. Pat. No. 4,077,138-Foerst issued Mar. 7, 1978.

The above explanations bring out that every individual simulator comprises eight signal inputs each from the two extraneous simulators, and two times eight signal outputs from which the first seven are connected in parallel.

According to the invention these sixteen in- and outputs per partner simulator are connected together with ground to a common seventeen-pole jack.

Every simulator is then connected with every other via a 17-pole cable by plugs. Having a total of three simulators, two of such jacks are needed for the simulator. For a total of m simulators, m−1 jacks are needed.

It is of course to be understood that the present invention is by no means limited to the specific showing in the drawings, but also comprises any modifications within the scope of the appended claims.

What I claim is:

1. A device for the simulation of a ride on a curved road using a screen for the picture of the road perspectively observed by the driver, as well as using a program for the generation of the road picture, as well as using control devices such as accelerator pedal, brake pedal, clutch pedal, gear shift lever and ruler, which devices influence the road picture, said device comprising: several individual simulators of the same kind being connected to each other via signal lines and comprising additional control devices, which generate and display to every driver the parallel track positions, the sloping positions, the speeds, and the noises of the other simulated vehicles using the screen and the loud speaker, means for generating respectively a picture angle, a distance z and track angle with connections, including:
   signal lines for the signals x of the parallel track positions, $\gamma$ of the picture angle, z of the distance, and V of the speed from every individual simulator to every other individual simulator, and wherein every individual simulator includes vehicle picture generators for the extraneous vehicle,
   a subtraction device in every vehicle picture generator computing the difference $\Delta z$ from the distances z of the own vehicle and that of the extraneous vehicle,
   another subtraction device in every vehicle picture generator computing the difference $\Delta V$ from the speed V of the own vehicle and that of the extraneous vehicle,
   signal lines for the signal x, $\gamma$, $\Delta z$ and $\Delta V$ as inputs to the vehicle picture generator, and
   further signal lines for the signals of the own vehicle x of the parallel track position, $\beta$ of the track angle, and $\gamma$ of the picture angle as inputs to the vehicle picture generator.

2. A device for the simulation of a ride on a curved road using a screen for the picture of the road perspectively observed by the driver, as well as using a program for the generation of the road picture, as well as using control devices such as accelerator pedal, brake pedal, clutch pedal, gear shift lever and ruler, which devices influence the road picture, said device comprising: several individual simulators of the same kind being connected to each other via signal lines and comprising additional control devices, which generate and display to every driver the parallel track positions, the sloping positions, the speeds, the track angle and the noises of the other simulated vehicles using the screen and the loud speaker, said individual simulator being designed for simulating a bike and including
   a computing device computing the sloping position $\gamma$, the parallel track position x, and the track angle $\beta$, using the ruler angle, the speed, the time and the dynamical behavior of a ride on a bike, a mechanical control device, turning the picture around a point in the vertical symmetrical line in an angle corresponding to the sloping position, a limiting device, limiting the sloping position $\gamma$ at an adjustable maximum value, a scratching noise generator, to which a scratching signal s is supplied when the maximum value is reached, a control device for a fall simulation, simulating a fall in the maximum of the sloping position at increasing sloping position, and a fall noise generator, generating at a fall a corresponding noise.

3. A device as claimed in claim 2, wherein said bike simulator is designed for simulating a bicycle and includes a tachometer which supplies the speed signal and which is connected to a wheel of a fitness tool which is driven by muscular power of the driver.

4. A device for the simulation of a ride on a curved road using a screen for the picture of the road perspectively observed by the driver, as well as using a program for the generation of the road picture, as well as using control devices such as accelerator pedal, brake pedal, clutch pedal, gear shift lever and ruler, which devices influence the road picture, said device comprising: several individual simulators of the same kind being connected to each other via signal lines and comprising additional control devices, which generate and display to every driver the parallel track positions, the sloping positions, the speeds, and the noises of the other simulated vehicles using the screen and the loud speaker, each individual simulator including: an error detection device, supplying an error measuring signal, when the picture of the front part of the vehicle touches the picture of any other vehicle, said error detection device including: a speed difference detection device, causing only the simulator of that vehicle with the higher speed to supply an error measuring signal in case of the two vehicles touching each other and so simulate an accident, and providing a signal to the concerned extraneous simulator for the error measuring signal, and wherein said control device for the simulation of an accident includes signal inputs, the signals being supplied by the error measuring devices of all extraneous simulators.

5. A device for the simulation of a ride on a curved road using a screen for the picture of the road perspectively observed by the driver, as well as using a program for the generation of the road picture, as well as using control devices such as accelerator pedal, brake pedal, clutch pedal, gear shift lever and ruler, which devices influence the road picture, said device comprising: several individual simulators of the same kind being connected to each other via signal lines and comprising additional control devices, which generate and display to every driver the parallel track positions, the sloping positions, the speeds, and the noises of the other simulated vehicles using the screen and the loud speaker, means for respectively providing signals of engine rotations, centrifugal accelerations, horn bottom, distances and noise generations, said devices for the generation of noises including: signal connection lines from any individual simulator to any other individual simulator for the signals of the engine rotations n, the centrifugal accelerations $b_F$, the horn bottom h and the distance z, as many noise generators for every individual simulator as the total of participants, being supplied individually by the transferred signals for the generation of the extraneous noises in the own simulator, a subtraction device for any extraneous noise generator in which the distance signal z of the own vehicle relative to the extraneous vehicle is computed by subtraction of the distances z, and a control unit, controlling the volume of the extraneous noises depending on the values of these distance differences.

6. A device for the simulation of a ride on a curved road using a screen for the picture of the road perspectively observed by the driver, as well as using a program for the generation of the road picture, as well as using control devices such as accelerator pedal, brake pedal, clutch pedal, gear shift lever and ruler, which devices influence the road picture, said device comprising: several individual simulators of the same kind being connected to each other via signal lines and comprising additional control devices, which generate and display to every driver the parallel track positions, the sloping positions, the speeds, and the noises of the other simulated vehicles using the screen and the loud speaker, apparatus for implementing Doppler-effect, structure defining distance signals, means for detecting when the distance signal crosses zero, said individual simulators including: connection lines for the speed signals from any individual simulator to all other individual simulators, a subtraction device for any two individual simulators, computing the signal $\Delta V$ of the speed difference between the own and the extraneous vehicle by subtracting the difference V, a flip-flop for any two individual simulators, being controlled by the distance signal $\Delta z$ and jumping from one state into the other with a hysteresis when the distances signal crosses zero, and a control unit controlling the frequency of the noise of any extraneous participant depending on the speed difference and the state of the flip-flop according to the Doppler-effect.

* * * * *